United States Patent [19]

Engelstad et al.

[11] Patent Number: 4,819,415
[45] Date of Patent: Apr. 11, 1989

[54] AUTOMATICALLY ADJUSTABLE DOFFER COLUMN FOR A COTTON PICKER

[75] Inventors: Jonathan L. Engelstad, Ankeny; William A. Best, West Des Moines, both of Iowa

[73] Assignee: Deere & Company, Moline, Ill.

[21] Appl. No.: 67,023

[22] Filed: Jun. 29, 1987

[51] Int. Cl.[4] ............................................. A01D 46/16
[52] U.S. Cl. ............................................. 56/41; 56/44
[58] Field of Search .................. 56/41, 50, 44, 45, 46, 56/47, 48

[56] References Cited

U.S. PATENT DOCUMENTS

| | | | |
|---|---|---|---|
| 2,664,689 | 1/1954 | Walker et al. | 56/41 |
| 3,014,332 | 12/1961 | Hubbard | 56/41 |
| 3,224,178 | 12/1965 | Kennedy | 56/41 |
| 3,245,210 | 4/1966 | Hubbard | 56/44 |
| 3,427,791 | 2/1969 | Hubbard | 56/41 |

OTHER PUBLICATIONS

Warner Electric Brochure, Ball Bearing Screws, cover page and p. 33.

Primary Examiner—Douglas Hart

[57] ABSTRACT

Self-adjusting supporting structure for positioning an upright column of doffer pads automatically with respect to corresponding rows of spindles in a cotton harvester row unit. A tapered roller bearing assembly supporting the doffer column includes an externally threaded housing threaded into an internally threaded adjuster housing support mounted on the row unit. The drag of the roller bearings is adjustable, and under normal operation of the row unit the drag force tends to thread the bearing assembly upwardly. However, this force is opposed by an opposite force caused by the weight of the doffer assembly which tends to thread the assembly downwardly to move the doffer pads closer to the spindles. The pitch of the screw threads is selected and the drag on the tapered bearings is adjusted so that the force created to move the doffer column downwardly into contact with the spindles is slightly larger than the drag force which tends to rotate the bearing assembly in the direction to move the doffers away from the spindles so that proper clearance is automatically maintained between the spindles and the doffers.

12 Claims, 2 Drawing Sheets

FIG. 2
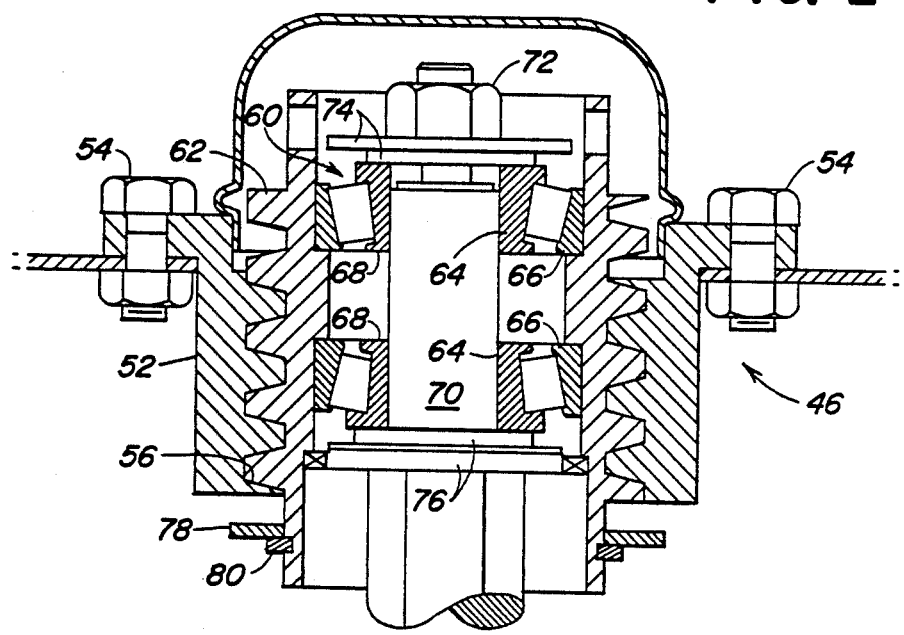
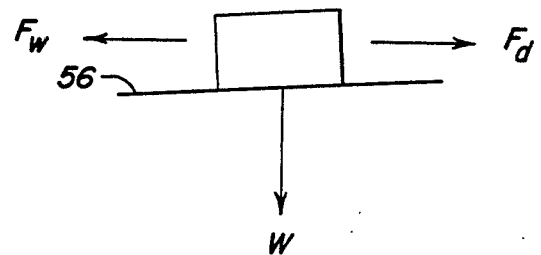
FIG. 3

AUTOMATICALLY ADJUSTABLE DOFFER COLUMN FOR A COTTON PICKER

BACKGROUND OF THE INVENTION

The present invention relates generally to cotton harvesting machines, and more specifically to an adjustable doffer column for a cotton picker.

A typical cotton picker includes a cotton picking drum mounted on an upright axis with a plurality of columns of vertically spaced and laterally extending cotton picker spindles. As the harvester advances in the field, the drum is rotated to move the cotton picker spindles from a position engaging the cotton plant to a position within in a row unit housing adjacent a doffing mechanism which dislodges the cotton from the spindles. The doffing mechanism includes an upright shaft with a plurality of vertically spaced doffer pads. Each pad is adapted to engage a row of picker spindles to remove the cotton by wiping or brushing the cotton from the spindles.

With such a conventional apparatus, it is extremely important that the doffer pads be correctly adjusted with respect to the rows of spindles to ensure complete doffing of the cotton from the spindles while at the same time preventing excessive contact of the pads with the spindles which would result in premature doffer pad deterioration and specking of the cotton.

Conventional doffer pad assemblies must be adjusted periodically by the operator to accommodate wear of the doffer pads. A conventional cotton harvester includes two picking drums per row with a doffer column associated with each of the drums, and therefore the periodic adjustment of the doffer assemblies can be relatively time-consuming and result in decreased productivity of the cotton harvester.

BRIEF SUMMARY OF THE INVENTION

It is therefore an object of the present invention to provide an improved mechanism for adjusting the doffer column on a cotton picker. It is a further object to provide such an assembly which is self-adjusting during normal operation of the harvester.

It is yet another object of the present invention to provide an automatically adjustable doffer column assembly for a cotton harvester which accurately and reliably maintains proper adjustment of the doffer pads with respect to the corresponding rows of cotton picker spindles on a cotton picker row unit. It is a further object to provide such an assembly which is relatively simple and compact in construction. It is a further object to provide such an assembly which requires few additional components.

In carrying out the present invention the doffer assembly is provided with a cam in the form of Acme threads fixed to the top of the picking unit. A tapered roller bearing assembly having an adjusting housing with mating cam follower threads is threaded into the cam and supports the doffer shaft vertically for rotation about an upright axis. The tapered roller bearing has a preselected adjustable drag such that under normal rotation of the doffer column, the drag tends to cause the bearing assembly to feed up the screw threads. However, this upward feed is resisted by the weight of the doffer column and the vibration of the running picking unit to tend to cause the doffer column to feed down to the plane of the picking spindles. The drag on the tapered roller bearing is adjusted and the pitch of the screw threads is selected such that the sum of the loads tends to move the doffers toward the spindles so that the proper clearance between spindle and doffer is automatically maintained for optimum doffing characteristics and doffer pad wear. The doffer assembly does not require manual adjustments or manual checking of the spindle clearance, and therefore labor savings and decreased down time for the cotton harvester are provided.

These and other objects, features and advantages of the present invention will become apparent to those skilled in the art from the description which follows and from the drawings

BRIEF DESCRIPTION OF THE DRAWINGS

FIG. 2 is an enlarged view of the upper portion of the assembly of FIG. 1.

FIG. 3 is a schematic view illustrating the forces operating on the screw threads of the assembly of FIG. 1.

DESCRIPTION OF THE PREFERRED EMBODIMENT

Figure 1:
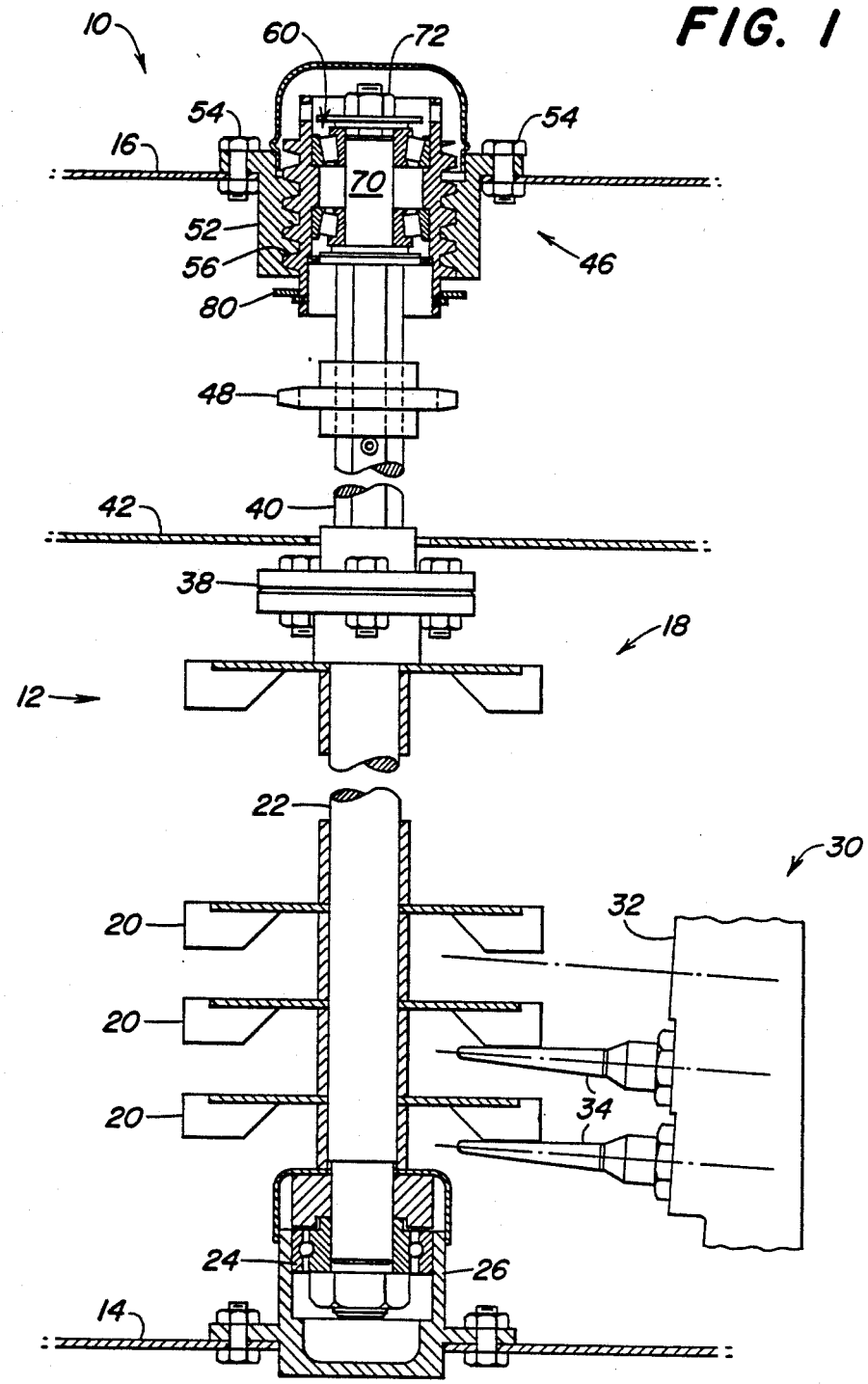
FIG. 1 is a side view, partially in section, showing the self adjusting doffer assembly of the present invention.

Referring to FIG. 1, there is shown a portion of a cotton harvester row unit 10 having a doffer assembly 12 supported for rotation between row unit floor 14 and upper row unit panel 16. The doffer assembly 12 includes a conventional upright doffer column 18 including vertically spaced doffers 20 mounted on a central doffer shaft 22. The lower end of the doffer shaft 22 is supported for rotation by a ball bearing assembly 24 which is vertically slidable in a bearing support 26 in a conventional manner to accommodate vertical adjustment of the doffer column 18.

The row unit 10 includes a picker drum indicated, generally at 30 including a plurality of upright picker bars 32 rotatably supporting vertical columns of spindles 34 which in turn define rows of spindles which sweep under the corresponding doffer pads 20 as shown in FIG. 1. The doffer column 18 is connected by a flanged bracket 38 to a drive shaft 40 extending upwardly through an aperture in central panel 42 of the row unit 10. Doffer supporting structure indicated generally at 46 is connected to the upper row unit panel 16 for rotatably supporting the drive shaft 40. A doffer drive sprocket 48 is mounted on the drive shaft 40 between the panels 16 and 42 and is driven by a chain of a conventional row unit drive assembly (not shown) located between the panels 16 and 42 for rotating the doffers 20 to doff cotton from the spindles 34.

The doffer supporting structure 46 includes structure for automatically locating the doffer column 18 axially as the row unit is operated. The structure 46 includes a bearing support or adjuster housing 52 connected by bolts 54 to the upper panel 16. The bearing support 52 includes an inclined surface 56, preferably in the form of Acme threads which are inclined upwardly in the direction of rotation of the doffer column 18. A tapered roller bearing assembly 60 is supported by the housing 52, and includes an externally threaded housing 62 adapted to be threaded into the housing 52 as shown in FIG. 1. A pair of axially spaced tapered roller bearings 64 include outer races 66 seated within the externally threaded housing 62 and inner races 68 rotatably supporting an upper drive shaft extension 70. The upper end of the extension 70 is threaded and receives a locking adjusting nut 72. Washers 74 and 76 are located at the opposite ends of the tapered roller bearings 64 and secure the bearings 64 therebetween as the locking adjusting nut 72 is tightened onto the threaded end of the extension 70. The nut 72 may be adjusted to vary the drag on the bearings 64. A washer 78 is secured by a retaining ring 80 on the outer circumference of the lower portion of the threaded housing 62 to prevent the housing 62 from rotating upwardly in the surface 56 beyond the preselected location.

As can be seen from FIG. 1, the weight of the entire doffer column 18 is supported substantially through the tapered roller bearing assembly 60 on the adjuster housing 52. The housings 52 and 62 are threaded such that the weight of the column and the vibration of the unit translate into a horizontal force (see $F_w$ of FIG. 3) which tends to move the tapered roller bearing assembly 60 downwardly with respect to the housing 52 so that the doffers 20 move closer to the spindles 34. However, this horizontal force $F_w$ is resisted by an opposite horizontal force (see $F_d$ of FIG. 2) caused by the bearing drag of the roller bearings 64 which tends to rotate the housing 62 in the direction to thread the housing 62 upwardly with respect to the housing 52. By adjusting the locking nut 72 to adjust the bearing drag such that the force $F_d$ is slightly less than the force $F_w$, the doffer column 18 will tend to feed downwardly into the spindles until the doffers 20 just touch the spindles and thereby reduce the force $F_w$, thus maintaining the correct relationship between the doffers 20 and the corresponding spindles 34. Once the adjusting nut 72 is set, the doffer column 18 will automatically be adjusted to provide proper vertical relationship between the doffers 20 and the spindles 34 without manual adjustment. The column 18 will automatically feed downwardly as the doffer pads 20 wear to maintain the proper relationship.

By way of example only, it has been found that by utilizing a screw pitch of approximately three degrees and by axially preloading the bearings 64 to obtain five to ten pound-inches of rolling torque between the bearings 64 and the bearing housing 62, a conventional doffer column 18, such as is used in the John Deere Model 9940 cotton harvester, the proper relationship between the doffers 20 and the spindles 34 will automatically be maintained.

Having described the preferred embodiment, it will be apparent that modifications can be made without departing from the scope of the invention as defined in the accompanying claims.

We claim:

1. Adjustable supporting structure for positioning an upright column of doffer pads mounted for rotation about an axis on a shaft adjacent vertically spaced picking spindles, said supporting structure comprising:
    a housing located above the pads;
    a bearing located in the housing for vertical adjustment with respect thereto and rotatably supporting the shaft, the vertical adjustment of the bearing determining the axial location of the shaft; and
    means for automatically adjusting the bearing vertically to axially locate the doffer pads with respect to the spindles as the doffer pads are rotated, said means for automatically adjusting including means for producing a first force dependent on rotation of the shaft for urging the bearing a first upright direction in the housing, means for producing a second force dependent upon the weight of the doffer column to move the column in the direction opposite the first direction in the housing, and means for adjusting the relative magnitude of the first and second forces to cause the doffer column to move downwardly until the pads touch the spindles.

2. The invention as set forth in claim 1 wherein the bearing is mounted in a second housing which includes screw threads and the first-mentioned housing comprises a complimentary threaded member for receiving the screw threads.

3. The invention as set forth in claim 2 wherein the means for producing the first force includes said bearing having a preselected bearing drag such that upon rotation of the shaft the bearing drag causes the second housing to feed upwardly with respect to the threaded member, and wherein the second force causes the second housing to feed downwardly on the threaded member.

4. The invention as set forth in claim 3 wherein the bearing comprises a tapered roller bearing and the means for adjusting the relative magnitude of the forces includes means for adjusting the bearing drag.

5. The invention as set forth in claim 4 wherein the means for adjusting the bearing drag comprises an adjusting nut for axially pre-loading the tapered roller bearing.

6. Adjustable supporting structure for positioning an upright column of doffer pads mounted for rotation about an axis on a shaft adjacent vertically spaced picking spindles, said supporting structure comprising:
    a threaded housing mounted on the row unit;
    bearing means including a threaded portion threaded into the housing for rotatably supporting the doffer column, said bearing means including means for producing a first force acting to rotate the threaded portion with respect to the housing to move the column in a first vertical direction with respect to the spindles, and wherein the weight of the doffer column acts to produce a second force opposite in direction to the first force acting to move the column in the opposite vertical direction; and
    means for adjusting the first force to automatically cause the column to move to a preselected location with respect to the spindles as the column rotates.

7. The invention as set forth in claim 6 wherein the means for adjusting includes means for producing a variable first horizontal force on the threaded portion, and wherein the weight of the column produces a second horizontal force opposite in direction to the first horizontal force, said means for adjusting comprising means producing a variable bearing drag to adjust the first horizontal force relative to the second horizontal force to cause the doffer pads to move towards the spindles.

8. The invention as set forth in claim 6 wherein the means for producing a first force comprises a tapered roller bearing having a bearing drag which tends to move the doffer column upwardly as the column rotates, and the means for adjusting comprises means for varying the bearing drag.

9. The invention as set forth in claim 6 wherein the bearing means is located above the doffer pads and includes means for rotatably suspending the doffer column with the pads located above corresponding spindles, said means for producing the first force comprising means for producing a variable bearing drag as the column of pads rotates to tend to rotate the bearing means upwardly with respect to the threaded housing.

10. The invention as set forth in claim 9 wherein the means for adjusting the first force includes means for varying the bearing drag.

11. The invention as set forth in claim 9 wherein the means for adjusting the first force includes means for varying the bearing drag such that the second force is greater than the first force to thereby move the doffer pads downwardly against the spindles as the column rotates.

12. The invention as set forth in claim 6 wherein the threaded portion has a screw pitch of approximately three degrees and wherein the means for producing a first force comprises means for providing a bearing drag in the range of from five to ten pound-inches.

* * * * *